Aug. 4, 1953         E. SCHNEIDER         2,648,040
REVERSIBLE MOTOR CONTROL SYSTEM
Filed Feb. 8, 1951
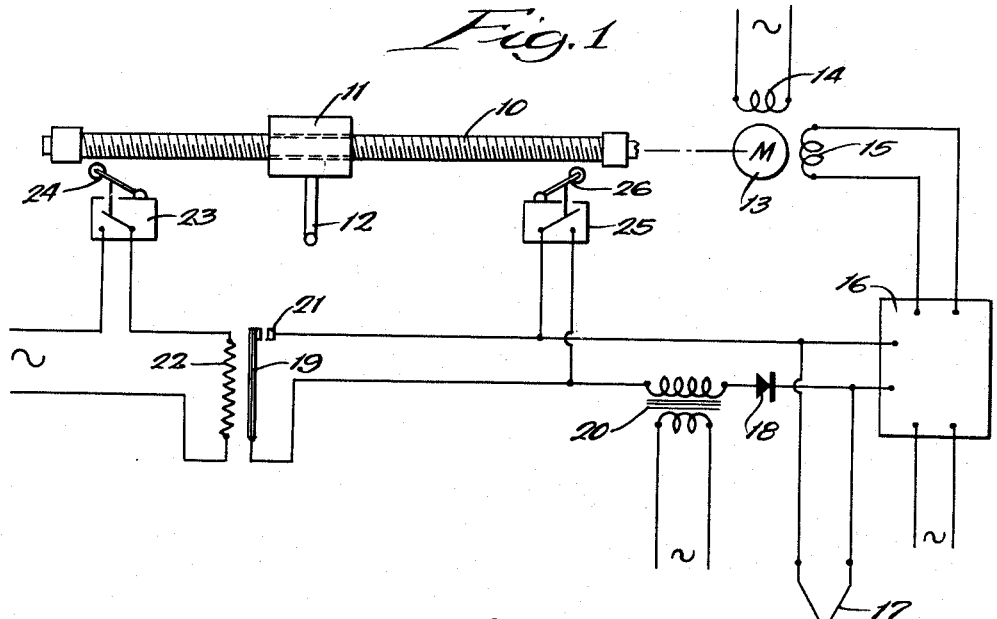
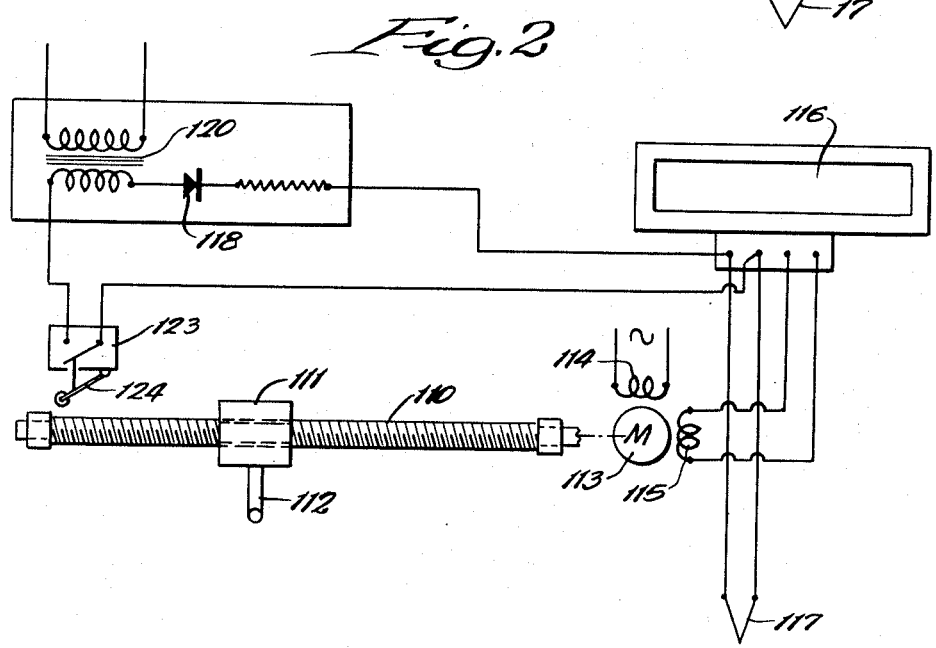
INVENTOR:
Elmer Schneider,
BY
E. L. Booth,
ATTORNEY.

Patented Aug. 4, 1953

2,648,040

UNITED STATES PATENT OFFICE 2,648,040

REVERSIBLE MOTOR CONTROL SYSTEM

Elmer Schneider, Chicago, Ill., assignor, by mesne assignments, to Barber-Colman Company, Rockford, Ill., a corporation of Illinois Application February 8, 1951, Serial No. 209,987

8 Claims. (Cl. 318—286)

This invention relates to electrical control instruments and more particularly to safety means to move the instrument to a safe condition in the event of failure of the source of control voltage, such as a thermocouple or the like.

It is common practice in thermocouple instruments and instruments operated from similar sources of voltage to provide a bias source connected to the instrument to drive it up-scale or toward its shut-off position in the event of failure of the thermocouple circuit. The bias voltage when applied to the instrument itself or directly to the motor produces an inaccurate response which cannot always be exactly compensated for in the setting of the instrument due to the fact that the instrument or the sensing circuit or both may not have straight line characteristics.

It is accordingly one of the objects of the present invention to provide an electrical control instrument in which no bias voltage is present during normal operation of the instrument but in which a bias voltage is provided upon failure of the sensing circuit to move the instrument to a safe condition.

Another object is to provide an electrical control instrument in which movement of the carriage to one end of its range of movement energizes a bias circuit to cause movement of the carriage toward the opposite end of its range. Preferably the carriage closes a switch when in its down-scale position and the switch energizes a biasing circuit which causes the carriage to move up-scale.

Still another object is to provide an electrical control instrument in which time delay means are provided in the bias circuit to delay energization thereof for a predetermined time after the carriage reaches its down-scale position and to maintain the bias circuit energized for a predetermined time after the carriage moves away from its down-scale position.

A further object is to provide an electrical control instrument in which the bias circuit drives the carriage to its maximum up-scale or shut-off position, and in such position the carriage operates a holding switch to maintain the bias circuit energized.

The above and other objects and advantages of the invention will be more readily apparent from the following description when read in connection with the accompanying drawing in which Figure 1 is a diagrammatic view of one form of instrument embodying the invention, and Figure 2 is a similar view of an alternative construction.

The instrument as illustrated in Figure 1 comprises an elongated screw 10 on which a carriage 11 is mounted to be moved along the scale as the screw is rotated. The carriage may carry a pen indicated at 12, to make a record on a moving chart and may also operate control instrumentalities to control the condition.

The screw is driven in one direction or the other by a reversible motor having a rotor 13 connected to the screw, a main winding 14 energized from any convenient alternating source and a control winding 15. The control winding is supplied with current of one phase or the other from a control instrument indicated generally at 16. The instrument 16 may be of any desired type which will produce a voltage of one phase or the other in response to changes in a control voltage, such as that produced by a thermocouple 17. One example of a satisfactory instrument of this type is that more particularly described and claimed in the co-pending application of Lang and Cross No. 786,678, filed November 18, 1947, now Patent No. 2,576,611.

In normal operation of the instrument as so far described, the motor 13 will be caused to rotate in one direction or the other as the thermocouple voltage changes to shift the carriage 11 along the screw 10 from one end to the other thereof. As illustrated, the left end of the screw is the down-scale end and the carriage will move to the left when the thermocouple voltage is low in response to a low temperature. This condition indicates a demand for heat and the instrument may operate valves, switches or the like to supply heat to the space in which the thermocouple is mounted. As the temperature rises and the thermocouple voltage increases, the carriage will move toward the right end of the screw 10 to its up-scale position. It will be understood that the instrument may be set to maintain the temperature at any desired value, generally toward the center of its scale.

In the event the thermocouple is broken or there is an interruption in the circuit from the thermocouple to the instrument, no voltage will be supplied to the instrument and it will operate the motor to move the carriage 11 to its extreme down-scale position. In this position the maximum quantity of heat will be supplied to the space and if the instrument is allowed to remain in this position for any substantial length of time overheating and severe damage may result.

To prevent the instrument from remaining in its down-scale position in the event of thermocouple burn-out or other failure a bias circuit is provided connected to the instrument to supply a voltage thereto which will cause the motor to drive the carriage up-scale. As shown, this circuit includes a source illustrated as a transformer 20 and a rectifier 18 connected to the thermocouple terminals. The circuit is controlled by a time delay switch shown as a bi-metal strip 19 which when heated, will flex to engage a contact 21 and complete the bias circuit. The strip 19 is heated by a heater 22 controlled by a normally open switch 23. An arm 24 on the switch 23 is positioned to be engaged by the carriage 11 when it is in its maximum down-scale position to energize the heating element. An additional normally open switch 25 is mounted adjacent the up-scale end of the carriage travel and has an arm 26 engaged by the carriage when it is in its up-scale position to close the switch. The switch 25 is connected in parallel with the switch 19 and functions as a holding switch.

Upon interruption of the thermocouple circuit the carriage will move down-scale and will close the switch 23 to energize the heating element 22. After a predetermined time the switch 19 will close to energize the bias circuit so that the carriage will be driven up-scale. If the thermocouple circuit is not actually broken and correctly indicates maximum demand for heat the bias voltage will be reduced by the thermocouple voltage so that the carriage will not move completely up-scale before the switch 19 opens. When this switch opens upon cooling of the bi-metal strip, the instrument will again be under sole control of the thermocouple and will operate in its normal manner.

However, if the thermocouple circuit is broken the carriage will travel to its full up-scale position before the switch 19 opens and will close the holding switch 25 to maintain the bias circuit energized. The instrument will therefore remain in its up-scale condition and will reduce or shut off the supply of heat so that no damage can result.

Figure 2 illustrates a simplified circuit, parts therein corresponding to like parts in Figure 1 being indicated by the same reference numerals plus 100. In this construction the bias circuit is controlled by a single normally open switch 123 which is closed by the carriage 111 when it moves to its maximum down-scale position and which will remain closed until it is manually released. In this construction, when the thermocouple fails the carriage will move down-scale to close the switch 123 at which time the bias circuit will be energized to drive the carriage up-scale. The bias voltage may be selected to move the carriage to its maximum up-scale position or to any desired intermediate position where it will remain until the circuit is manually reset.

In both of these circuits as shown, it will be noted that in the normal operating condition no bias voltage is present and the only voltage effective to control the instrument and the motor is that produced by the thermocouple itself. The instrument can therefore operate with a high degree of accuracy but will still move to a safe condition upon failure of the thermocouple.

While two embodiments of the invention have been shown and described in detail, it will be understood that these are illustrative only and are not to be taken as a definition of the scope of the invention, reference being had for this purpose to the appended claims.

What is claimed is:

1. An electrical controlling instrument comprising a carriage movable between positions corresponding to opposite ends of a scale, means including a reversible electric motor to move the carriage, an instrument responsive to voltages applied thereto to control the direction and extent of movement of the motor, means normally to supply a controlling voltage to the instrument, switch means mounted adjacent one of the end positions of the carriage to be engaged and operated by the carriage when it is in said position, and a bias circuit energized by operation of the switch means and connected to the instrument to apply a bias voltage to the instrument such as to cause the motor to move the carriage toward its other end position.

2. An electrical controlling instrument comprising a carriage movable between positions corresponding to opposite ends of a scale, means including a reversible electric motor to move the carriage, an instrument responsive to voltages applied thereto to control the direction and extent of movement of the motor, means normally to supply a controlling voltage to the instrument, the carriage moving to one of its end positions when no controlling voltage is supplied to the instrument, a bias circuit connected to the instrument to apply a voltage thereto such as to cause the motor to move the carriage toward its other end position, and a switch operated by movement of the carriage to said one of its end positions to control the bias circuit.

3. An electrical controlling instrument comprising a carriage movable between positions corresponding to opposite ends of a scale, means including a reversible electric motor to move the carriage, an instrument responsive to voltages applied thereto to control the direction and extent of movement of the motor, means normally to supply a controlling voltage to the instrument, a control device operated by the carriage when it moves to one of its end positions, time delay means energized by operation of the control device and a bias circuit controlled by the time delay means and connected to the instrument to apply a voltage to the instrument such as to cause the motor to move the carriage toward its other end position.

4. An electrical controlling instrument comprising a carriage movable between positions corresponding to opposite ends of a scale, means including a reversible electric motor to move the carriage, an instrument responsive to voltages applied thereto to control the direction and extent of movement of the motor, means normally to supply a controlling voltage to the instrument, a switch operated by the carriage when it moves to one of its end positions, heating means connected to the switch to be energized therethrough when the switch is closed, a bi-metal strip heated by the heating means, and a circuit energized by the bi-metal strip when it is heated and connected to the instrument to apply a voltage to the instrument such as to cause the motor to move the carriage toward its other end position.

5. An electrical controlling instrument comprising a carriage movable between positions corresponding to opposite ends of a scale, means including a reversible electric motor to move the carriage, an instrument responsive to voltages applied thereto to control the direction and extent of movement of the motor, means normally to supply a controlling voltage to the instrument, a pair of switches mounted adjacent to the end positions of the carriage to be engaged and operated by the carriage when it moves to its end positions respectively, a circuit energized by operation of one of the switches to apply a voltage to the instrument such as to cause the motor to move the carriage toward the other switch, and connections from the other switch to the circuit to maintain the circuit energized when the other switch is operated by the carriage.

6. An electrical controlling instrument comprising a carriage movable between positions corresponding to opposite ends of a scale, means including a reversible electric motor to move the carriage, an instrument responsive to voltages applied thereto to control the direction and extent of movement of the motor, means normally to supply a controlling voltage to the instrument, a pair of switches mounted adjacent to the end positions of the carriage to be engaged and operated by the carriage when it moves to its end positions respectively, a circuit energized by operation of one of the switches to apply a voltage to the instrument such as to cause the motor to move the carriage toward the other switch, time delay means to de-energize the circuit a predetermined time after it is energized, and connections from the other switch to the circuit to maintain the circuit energized regardless of said time delay means.

7. An electrical controlling instrument comprising a carriage movable between positions corresponding to opposite ends of a scale, means including a reversible electric motor to move the carriage, an instrument responsive to voltages applied thereto to control the direction and extent of movement of the motor, means normally to supply a controlling voltage to the instrument, a pair of switches mounted adjacent to the end positions of the carriage to be engaged and operated by the carriage when it moves to its end positions respectively, a time delay switch controlled by one of the switches to close a predetermined time after the switch is closed and to open a predetermined time after the switch is opened, a circuit energized by the time delay switch when it is closed to apply a voltage to the instrument such as to cause the motor to move the carriage toward the other of the pair of switches, and connections from said other of the switches to the circuit to maintain the circuit energized regardless of opening of the time delay switch.

8. An electrical controlling instrument comprising a carriage movable between positions corresponding to opposite ends of a scale, means including a reversible electric motor to move the carriage, an instrument responsive to voltages applied thereto to control the direction and extent of movement of the motor, means normally to supply a controlling voltage to the instrument, the carriage moving to one of its end positions when no controlling voltage is supplied to the instrument, a circuit operatively connected to the motor and operable when closed to cause a voltage to be applied to the motor for movement of said carriage toward its other end position, and a switch operated in response to movement of the carriage to said one of its end positions to control the circuit.

ELMER SCHNEIDER.

References Cited in the file of this patent

UNITED STATES PATENTS

| Number | Name | Date |
|---|---|---|
| 1,226,696 | Ramseur | May 22, 1917 |